(12) United States Patent
Wu et al.

(10) Patent No.: US 10,771,130 B2
(45) Date of Patent: Sep. 8, 2020

(54) MULTI-ANTENNA DATA TRANSMISSION METHOD, NETWORK DEVICE, TERMINAL DEVICE, AND SYSTEM

(71) Applicant: Huawei Technologies Co., Ltd., Shenzhen (CN)

(72) Inventors: Ye Wu, Shanghai (CN); Jin Liu, Shenzhen (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/039,986

(22) Filed: Jul. 19, 2018

(65) Prior Publication Data

US 2018/0323838 A1 Nov. 8, 2018

Related U.S. Application Data

(63) Continuation of application No. PCT/CN2016/106775, filed on Nov. 22, 2016.

(30) Foreign Application Priority Data

Jan. 20, 2016 (CN) .......................... 2016 1 0039033

(51) Int. Cl.
  *H04B 7/0456* (2017.01)
  *H04B 7/06* (2006.01)
  (Continued)

(52) U.S. Cl.
  CPC ......... *H04B 7/0456* (2013.01); *H04B 7/0417* (2013.01); *H04B 7/063* (2013.01);
  (Continued)

(58) Field of Classification Search
  None
  See application file for complete search history.

(56) References Cited

U.S. PATENT DOCUMENTS 8,401,591 B2 * 3/2013 Catreux-Erceg ....... H04B 7/061
  375/347
2008/0310523 A1 * 12/2008 Hui ...................... H04B 7/0417
  375/260

(Continued)

FOREIGN PATENT DOCUMENTS

CN   101359953 A   2/2009
CN   102006106 A   4/2011

(Continued)

*Primary Examiner* — Xavier S Wong
(74) *Attorney, Agent, or Firm* — Leydig, Voit & Mayer, Ltd.

(57) ABSTRACT

A multi-antenna data transmission method, network device, terminal device, and system is suggested to effectively increase a system throughput. The method includes: sending, by a network device, downlink control signaling to a terminal device, where the downlink control signaling instructs the terminal device to feed back statistical channel parameter information, the statistical channel parameter information is determined by the terminal device according to statistical channel information, and the statistical channel information is obtained after the terminal device measures instantaneous channels many times; receiving, by the network device, the statistical channel parameter information that is determined according to the downlink control signaling and that is sent by the terminal device; and processing, by the network device, downlink data according to the statistical channel parameter information, and sending processed downlink data to the terminal device.

16 Claims, 4 Drawing Sheets

(51) Int. Cl.
  *H04L 25/02* (2006.01)
  *H04B 7/0417* (2017.01)
  *H04L 5/00* (2006.01)
(52) U.S. Cl.
  CPC ......... *H04B 7/0626* (2013.01); *H04B 7/0639* (2013.01); *H04L 5/0051* (2013.01); *H04L 25/0204* (2013.01); *H04L 25/0224* (2013.01)

(56) References Cited

U.S. PATENT DOCUMENTS

| | | | |
|---|---|---|---|
| 2010/0246494 A1* | 9/2010 | Sanayei | H04B 7/0417 370/328 |
| 2011/0103493 A1 | 5/2011 | Xia et al. | |
| 2013/0215988 A1 | 8/2013 | Nagata et al. | |
| 2013/0244676 A1 | 9/2013 | Koivisto et al. | |
| 2015/0016379 A1* | 1/2015 | Nam | H04B 7/0456 370/329 |
| 2015/0289241 A1* | 10/2015 | Gresset | H04L 5/006 370/330 |
| 2016/0127093 A1* | 5/2016 | Jiang | H04W 72/06 370/330 |
| 2017/0047973 A1* | 2/2017 | Wu | H04B 7/0456 |

FOREIGN PATENT DOCUMENTS

| | | |
|---|---|---|
| CN | 102598528 A | 7/2012 |
| CN | 103188799 A | 7/2013 |
| CN | 103188827 A | 7/2013 |
| CN | 103873124 A | 6/2014 |
| CN | 104247289 A | 12/2014 |
| WO | 2011050756 A1 | 5/2011 |
| WO | 2013099284 A1 | 7/2013 |

* cited by examiner

MULTI-ANTENNA DATA TRANSMISSION METHOD, NETWORK DEVICE, TERMINAL DEVICE, AND SYSTEM

CROSS-REFERENCE TO RELATED APPLICATIONS

This application is a continuation of International Application No. PCT/CN2016/106775, filed on Nov. 22, 2016, which claims priority to Chinese Patent Application No. 201610039033.6, filed on Jan. 20, 2016. The disclosures of the aforementioned applications are hereby incorporated by reference in their entireties.

TECHNICAL FIELD

The present invention relates to the communications field, and in particular, to a multi-antenna data transmission method, network device, terminal device, and system.

BACKGROUND

In 3GPP Long Term Evolution/3GPP Long Term Evolution-Advanced (LTE/LTE-A), with continuous rapid growth in a quantity of antennas at a data transmit end, a quantity of to-be-served user equipments (UEs), that is, a quantity of to-be-scheduled UEs, is also growing rapidly. More antennas can provide a higher degree of spatial freedom. This creates a favorable condition for multiplexing a plurality of data streams (which may be single-user multiple-input and multiple-output (SU-MIMO) or multi-user multiple-input and multiple-output (MU-MIMO)) in downlink space.

To obtain a high degree of spatial freedom that can be provided by large-scale antennas, a data transmit end (usually, a base station) needs to obtain related channel state information (CSI), so that a precise precoding matrix (precoder) is obtained. In the prior art (for example, LTE/LTE-A), during MIMO, a data transmit end usually obtains CSI using two methods.

One method is: In Time Division Duplex (TDD)/Frequency Division Duplex (FDD), a data transmit end sends a pilot for measuring downlink CSI, a data receive end (usually, UE) measures the pilot to obtain the CSI, the UE feeds back the CSI (usually, quantized CSI, which is PMI+RI in LTE), and the data transmit end precodes data using the CSI and sends precoded data. The other method is: In TDD, a data receive end sends a pilot (for example, an SRS in LTE/LTE-A) for measuring uplink CSI, a data transmit end measures uplink channel CSI, the data transmit end determines, according to channel reciprocity, that uplink channel measurement is equivalent to downlink channel measurement (usually, calibration needs to be performed using a necessary reciprocity parameter), and then the data transmit end precodes data using the CSI and sends precoded data.

Because downlink pilot overheads are directly proportional to a quantity of antennas at a data transmit end, uplink pilot overheads are directly proportional to a quantity of to-be-served UEs, and a quantity of uplink CSI feedbacks is also directly proportional to the quantity of antennas at the data transmit end, when there are not many antennas (for example, four/eight antennas in LTE/LTE-A) at the data transmit end, the pilot overheads and the quantity of uplink CSI feedbacks can be controlled. However, when there are many antennas (a quantity of UEs that can be scheduled also increases), the uplink and downlink pilot overheads and the quantity of uplink CSI feedbacks occupy a large quantity of time-frequency resources. As a result, there are fewer time-frequency resources available for data transmission, and a system throughput is greatly affected.

SUMMARY

Embodiments of the present invention provide a multi-antenna data transmission method, network device, terminal device, and system, so as to increase a system throughput.

According to a first aspect, a multi-antenna data transmission method is provided, where the method includes: sending, by a network device, downlink control signaling to a terminal device, where the downlink control signaling instructs the terminal device to feed back statistical channel parameter information, the statistical channel parameter information is determined by the terminal device according to statistical channel information, and the statistical channel information is obtained by means of computation after the terminal device measures instantaneous channels many times; and receiving, by the network device, the statistical channel parameter information that is determined according to the downlink control signaling and that is sent by the terminal device.

Therefore, according to the multi-antenna data transmission method in embodiments of the present invention, the network device sends the downlink control signaling to the terminal device, where the downlink control signaling may be used to instruct the terminal device to feed back the statistical channel parameter information, and the statistical channel parameter information may be obtained by the terminal device by processing the statistical channel information. According to this method, the network device can obtain the statistical channel information or information related to the statistical channel information (for example, the statistical channel parameter information), so that the network device can process downlink data according to the parameter information fed back by the terminal device.

With reference to the first aspect, in an implementation of the first aspect, the statistical channel parameter information is determined by the terminal device by performing dimensionality reduction and quantization processing on the statistical channel information, and the statistical channel information is obtained by means of computation after the terminal device measures the instantaneous channels many times according to a level-one reference signal RS sent by the network device.

It should be understood that the network device may receive the statistical channel parameter information and the processed statistical channel information that are fed back by the terminal device according to the downlink control information, where the processed statistical channel information is obtained by the terminal device by performing dimensionality reduction and quantization processing on the statistical channel information.

With reference to any one of the first aspect or the foregoing implementation of the first aspect, in another implementation of the first aspect, the statistical channel parameter information includes a statistical channel dimensionality parameter and a statistical channel quantization parameter, where the statistical channel dimensionality parameter indicates an effective dimensionality value of statistical channel information obtained after dimensionality reduction; and the statistical channel quantization parameter indicates a quantization index parameter that is required when the terminal device performs quantization processing on the statistical channel information obtained after dimensionality reduction.

With reference to any one of the first aspect or the foregoing implementations of the first aspect, in another implementation of the first aspect, the downlink control signaling is further used to instruct the terminal device to feed back instantaneous channel parameter information, the instantaneous channel parameter information is determined by the terminal device according to instantaneous channel information, and the instantaneous channel information is obtained by the terminal device by measuring an instantaneous channel; and the method further includes: receiving, by the network device, the instantaneous channel parameter information that is determined according to the downlink control signaling and that is sent by the terminal device.

With reference to any one of the first aspect or the foregoing implementations of the first aspect, in another implementation of the first aspect, the instantaneous channel parameter information is determined by the terminal device by performing quantization processing on the instantaneous channel information, the instantaneous channel information is obtained by the terminal device by measuring the instantaneous channel according to a precoded level-two RS sent by the network device, and the precoded level-two RS is determined by the network device by precoding the level-two RS according to the statistical channel parameter information.

It should be understood that the network device may receive the instantaneous channel parameter information and the processed instantaneous channel information that are fed back by the terminal device according to the downlink control information, where the processed instantaneous channel information is obtained by the terminal device by performing quantization processing on the instantaneous channel information.

With reference to any one of the first aspect or the foregoing implementations of the first aspect, in another implementation of the first aspect, the instantaneous channel parameter information includes an instantaneous channel dimensionality parameter and an instantaneous channel quantization parameter, where the instantaneous channel dimensionality parameter indicates an effective dimensionality value of the instantaneous channel information; and the instantaneous channel quantization parameter indicates a quantization index parameter that is required when the terminal device quantizes the instantaneous channel information.

Therefore, according to the multi-antenna data transmission method in embodiments of the present invention, the network device sends the downlink control signaling to the terminal device, to instruct the terminal device to feed back the statistical channel parameter information and the instantaneous channel parameter information; and performs two-level precoding on the downlink data according to the parameter information fed back by the terminal device, so that parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

With reference to any one of the first aspect or the foregoing implementations of the first aspect, in another implementation of the first aspect, the downlink control signaling includes first signaling and second signaling, the first signaling instructs the terminal device to feed back the statistical channel parameter information, and the second signaling instructs the terminal device to feed back the instantaneous channel parameter information.

With reference to any one of the first aspect or the foregoing implementations of the first aspect, in another implementation of the first aspect, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

With reference to any one of the first aspect or the foregoing implementations of the first aspect, in another implementation of the first aspect, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

With reference to any one of the first aspect or the foregoing implementations of the first aspect, in another implementation of the first aspect, the downlink control signaling instructs the terminal device to periodically feed back the statistical channel parameter information and the instantaneous channel parameter information.

With reference to any one of the first aspect or the foregoing implementations of the first aspect, in another implementation of the first aspect, the downlink control signaling occupies a first control field and a second control field, the first control field is used to instruct the terminal device to feed back the statistical channel parameter information, and the second control field is used to instruct the terminal device to feed back the instantaneous channel parameter information.

It should be understood that the first control field and the second control field each may occupy one bit or at least two bits.

With reference to any one of the first aspect or the foregoing implementations of the first aspect, in another implementation of the first aspect, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

It should be understood that the first control sub-field and the second control sub-field each may occupy one bit or at least two bits.

With reference to any one of the first aspect or the foregoing implementations of the first aspect, in another implementation of the first aspect, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

It should be understood that the third control sub-field and the fourth control sub-field each may occupy one bit or at least two bits.

With reference to any one of the first aspect or the foregoing implementations of the first aspect, in another implementation of the first aspect, the receiving, by the network device, the statistical channel parameter information and the instantaneous channel parameter information that are determined according to the downlink control signaling and that are sent by the terminal device includes: receiving, by the network device, the statistical channel parameter information, the processed statistical channel information, the instantaneous channel parameter information, and the processed instantaneous channel information that are determined according to the downlink control signaling and that are sent by the terminal device; and the processing, by the network device, downlink data according to the statistical channel parameter information and the instantaneous channel parameter information includes: performing, by the network device, level-one precoding according to the statistical channel parameter information and the processed statistical channel information, and performing level-two precoding according to the instantaneous channel parameter information and the processed instantaneous channel information.

According to a second aspect, a multi-antenna data transmission method is provided, where the method includes: receiving, by a terminal device, downlink control signaling sent by a network device, where the downlink control signaling instructs the terminal device to feed back statistical channel parameter information to the network device; determining, by the terminal device, the statistical channel parameter information according to statistical channel information that is obtained by means of computation after the terminal device measures a plurality of instantaneous channels; and feeding back, by the terminal device, the statistical channel parameter information to the network device according to the downlink control signaling.

Therefore, according to the multi-antenna data transmission method in embodiments of the present invention, the network device sends the downlink control signaling to the terminal device, where the downlink control signaling may instruct the terminal device to feed back the statistical channel parameter information; and the terminal device processes the statistical channel information that is obtained by means of measurement performed by the terminal device on the instantaneous channels many times, to determine the statistical channel parameter information, and feeds back the statistical channel parameter information to the network device. This resolves a prior-art problem that the statistical channel information or information related to the statistical channel information (for example, the statistical channel parameter information) cannot be fed back to the network device, so that the network device processes downlink data according to the parameter information fed back by the terminal device.

With reference to the second aspect, in an implementation of the second aspect, the determining, by the terminal device, the statistical channel parameter information according to statistical channel information that is obtained by means of computation after the terminal device measures a plurality of instantaneous channels includes: measuring, by the terminal device, the plurality of instantaneous channels according to a level-one reference signal RS sent by the network device, to obtain the statistical channel information by means of computation; and performing, by the terminal device, dimensionality reduction and quantization processing on the statistical channel information to determine the statistical channel parameter information.

With reference to any one of the second aspect or the foregoing implementation of the second aspect, in another implementation of the second aspect, the statistical channel parameter information includes a statistical channel dimensionality parameter and a statistical channel quantization parameter; and the performing, by the terminal device, dimensionality reduction and quantization processing on the statistical channel information to determine the statistical channel parameter information includes: performing, by the terminal device, dimensionality reduction processing on the statistical channel information, and determining, as the statistical channel dimensionality parameter, an effective dimensionality value of statistical channel information obtained after dimensionality reduction; and performing, by the terminal device, quantization processing on the statistical channel information obtained after dimensionality reduction, and determining, as the statistical channel quantization parameter, a quantization index parameter that is required when quantization processing is performed.

It should be understood that the terminal device may feed back the statistical channel parameter information and the processed statistical channel information to the network device according to the downlink control information, where the processed statistical channel information is obtained by the terminal device by performing dimensionality reduction and quantization processing on the statistical channel information.

With reference to any one of the second aspect or the foregoing implementations of the second aspect, in another implementation of the second aspect, the downlink control signaling is further used to instruct the terminal device to feed back instantaneous channel parameter information to the network device; and the method further includes: determining, by the terminal device, the instantaneous channel parameter information according to instantaneous channel information that is obtained by means of measurement performed by the terminal device on an instantaneous channel; and feeding back, by the terminal device, the instantaneous channel parameter information to the network device according to the downlink control signaling; and the receiving, by the terminal device, downlink data sent by the network device, where the downlink data is data obtained by the network device by performing processing according to the statistical channel parameter information includes: receiving, by the terminal device, the downlink data sent by the network device, where the downlink data is data obtained by the network device by performing processing according to the statistical channel parameter information and the instantaneous channel parameter information.

With reference to any one of the second aspect or the foregoing implementations of the second aspect, in another implementation of the second aspect, the determining, by the terminal device, the instantaneous channel parameter information according to instantaneous channel information that is obtained by means of measurement performed by the terminal device on an instantaneous channel includes: measuring, by the terminal device, the instantaneous channel according to a precoded level-two RS sent by the network device, to obtain the instantaneous channel information, where the precoded level-two RS is determined by the network device by precoding the level-two RS according to the statistical channel parameter information; and performing, by the terminal device, quantization processing on the instantaneous channel information to determine the instantaneous channel parameter information.

It should be understood that the terminal device may feed back the instantaneous channel parameter information and the processed instantaneous channel information to the network device according to the downlink control information, where the processed instantaneous channel information is obtained by the terminal device by performing quantization processing on the instantaneous channel information.

With reference to any one of the second aspect or the foregoing implementations of the second aspect, in another implementation of the second aspect, the instantaneous channel parameter information includes an instantaneous channel dimensionality parameter and an instantaneous channel quantization parameter; and the performing, by the terminal device, quantization processing on the instantaneous channel information to determine the instantaneous channel parameter information includes: determining, by the terminal device, an effective dimensionality value of the instantaneous channel information as the instantaneous channel dimensionality parameter; and performing, by the terminal device, quantization processing on the instantaneous channel information, and determining, as the instantaneous channel quantization parameter, a quantization index parameter that is required when quantization processing is performed.

Therefore, according to the multi-antenna data transmission method in embodiments of the present invention, the network device sends the downlink control signaling to the terminal device, where the downlink control signaling may instruct the terminal device to feed back the statistical channel parameter information and the instantaneous channel parameter information, so that the network device performs two-level precoding on the downlink data according to the parameter information fed back by the terminal device. In this way, parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

With reference to any one of the second aspect or the foregoing implementations of the second aspect, in another implementation of the second aspect, the downlink control signaling includes first signaling and second signaling, the first signaling instructs the terminal device to feed back the statistical channel parameter information, and the second signaling instructs the terminal device to feed back the instantaneous channel parameter information.

With reference to any one of the second aspect or the foregoing implementations of the second aspect, in another implementation of the second aspect, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

With reference to any one of the second aspect or the foregoing implementations of the second aspect, in another implementation of the second aspect, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

With reference to any one of the second aspect or the foregoing implementations of the second aspect, in another implementation of the second aspect, the downlink control signaling instructs the terminal device to periodically feed back the statistical channel parameter information and the instantaneous channel parameter information.

With reference to any one of the second aspect or the foregoing implementations of the second aspect, in another implementation of the second aspect, the downlink control signaling occupies a first control field and a second control field, the first control field is used to instruct the terminal device to feed back the statistical channel parameter information, and the second control field is used to instruct the terminal device to feed back the instantaneous channel parameter information.

It should be understood that the first control field and the second control field each may occupy one bit or at least two bits.

With reference to any one of the second aspect or the foregoing implementations of the second aspect, in another implementation of the second aspect, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

It should be understood that the first control sub-field and the second control sub-field each may occupy one bit or at least two bits.

With reference to any one of the second aspect or the foregoing implementations of the second aspect, in another implementation of the second aspect, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

It should be understood that the third control sub-field and the fourth control sub-field each may occupy one bit or at least two bits.

According to a third aspect, a multi-antenna data transmission network device is provided, and is configured to perform the method in the first aspect or any possible implementation of the first aspect. Specifically, the network device includes a unit configured to perform the method in the first aspect or any possible implementation of the first aspect.

According to a fourth aspect, a multi-antenna data transmission terminal device is provided, and is configured to perform the method in the second aspect or any possible implementation of the second aspect. Specifically, the terminal device includes a unit configured to perform the method in the second aspect or any possible implementation of the second aspect.

According to a fifth aspect, a multi-antenna data transmission system is provided, where the system includes the network device in the third aspect and the terminal device in the fourth aspect.

According to a sixth aspect, a multi-antenna data transmission network device is provided, including: a memory and a processor, where the memory is configured to store an instruction; and the processor is configured to execute the instruction stored in the memory, and when the processor executes the instruction stored in the memory, the execution enables the processor to perform the method in the first aspect or any possible implementation of the first aspect.

According to a seventh aspect, a multi-antenna data transmission terminal device is provided, including: a memory and a processor, where the memory is configured to store an instruction; and the processor is configured to execute the instruction stored in the memory, and when the processor executes the instruction stored in the memory, the execution enables the processor to perform the method in the second aspect or any possible implementation of the second aspect.

According to an eighth aspect, a computer-readable medium is provided, and is configured to store a computer program, where the computer program includes an instruction used to perform the method in the first aspect or any possible implementation of the first aspect.

According to a ninth aspect, a computer-readable medium is provided, and is configured to store a computer program, where the computer program includes an instruction used to perform the method in the second aspect or any possible implementation of the second aspect.

DESCRIPTION OF EMBODIMENTS

The following clearly describes the technical solutions in the embodiments of the present invention with reference to the accompanying drawings in the embodiments of the present invention.

Figure 1:
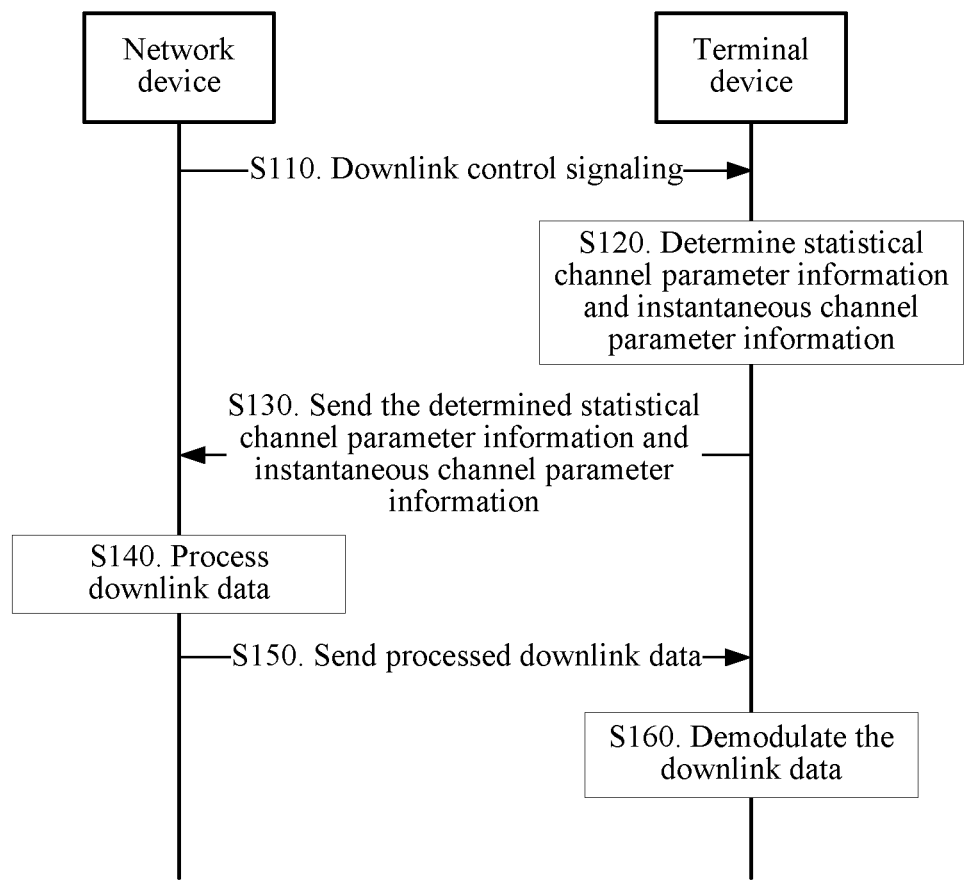
FIG. 1 is a schematic flowchart of a multi-antenna data transmission method according to an embodiment of the present invention.

FIG. 1 is a schematic flowchart of a multi-antenna data transmission method 100 according to an embodiment of the present invention. The method may be applicable to TDD and FDD scenarios. As shown in FIG. 1, the method 100 includes the following steps.

S110. A network device sends downlink control signaling to a terminal device, where the downlink control signaling is used to instruct the terminal device to feed back statistical channel parameter information, the statistical channel parameter information is used by the terminal device to process statistical channel information, and the statistical channel information is obtained by the terminal device by measuring instantaneous channels many times.

It should be understood that the channel is a path for transmitting information, and specifically, a physical channel for transmitting information. The channel may be a space physical propagation medium. The medium may have an instantaneous characteristic and a statistical characteristic, and therefore, the channel similarly has an instantaneous characteristic and a statistical characteristic.

It should be understood that the network device may be a device that communicates with a mobile device. The network device may be a Base Transceiver Station, (BTS) in a Global System of Mobile communications (GSM) or Code Division Multiple Access (CDMA), a NodeB (NB) in Wideband Code Division Multiple Access (WCDMA), an evolved Node B (eNB or eNodeB) or an access point in Long Term Evolution (LTE), an in-vehicle device, a wearable device, a network device in a future 5G network, or a network device in a future evolved Public Land Mobile Network (PLMN).

It should be understood that the terminal device may be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device, another processing device connected to a wireless modem, an in-vehicle device, a wearable device, a terminal device in a future 5G network, or a terminal device in a future evolved Public Land Mobile Network (PLMN).

Specifically, the statistical channel parameter information in the downlink control signaling is used by the terminal device to process the statistical channel information. The statistical channel information is obtained by means of computation after the terminal device measures the instantaneous channels many times on a time-frequency resource according to a level-one reference signal RS sent by the network device. The statistical channel parameter information may include a statistical channel dimensionality parameter and a statistical channel quantization parameter. During processing of the statistical channel information, the terminal device may perform dimensionality reduction and quantization processing on the statistical channel information to obtain processed statistical channel information. The statistical channel dimensionality parameter indicates an effective dimensionality value of the statistical channel information obtained after dimensionality reduction, and the statistical channel quantization parameter indicates a quantization index parameter that is required when quantization processing is performed on the statistical channel information.

Therefore, according to the multi-antenna data transmission method in this embodiment of the present invention, the network device sends the downlink control signaling to the terminal device, where the downlink control signaling may be used to instruct the terminal device to feed back the statistical channel parameter information, and the statistical channel parameter information may be obtained by the terminal device by processing the statistical channel information. According to this method, the network device can obtain the statistical channel information or information related to the statistical channel information (for example, the statistical channel parameter information), so that the network device can process downlink data according to the parameter information fed back by the terminal device.

Optionally, in an embodiment, the network device sends the downlink control signaling to the terminal device. The downlink control signaling may be further used to instruct the terminal device to feed back instantaneous channel parameter information. The instantaneous channel parameter information is used by the terminal device to process instantaneous channel information. The instantaneous channel information is obtained by the terminal device by measuring an instantaneous channel according to a dimensionality-reduced level-two RS that is sent by the network device. The dimensionality-reduced level-two RS is determined by the network device by performing level-one precoding on a level-two RS according to the statistical channel parameter information fed back by the terminal device. The instantaneous channel information may include an instantaneous channel dimensionality parameter and an instantaneous channel quantization parameter. The terminal device measures the instantaneous channel to obtain the instantaneous channel information, and performs quantization processing on the instantaneous channel information to obtain processed instantaneous channel information. The instantaneous channel dimensionality parameter indicates an effective dimensionality value of the instantaneous channel information, and the instantaneous channel quantization parameter indicates a quantization index parameter that is required when quantization processing is performed on the instantaneous channel information.

In this embodiment of the present invention, the network device sends the downlink control signaling to instruct the terminal device to feed back the statistical channel parameter information and/or the instantaneous channel parameter information. Optionally, the terminal device may be instructed to periodically perform feedback. For example, the network device instructs, using a Radio Resource Control (RRC) message, the terminal device to periodically perform feedback; or may aperiodically trigger the terminal device to perform feedback, for example, trigger, by adding the downlink control signaling to a control field in a physical downlink control channel (PDCCH), the terminal device to feed back parameter information. This is not limited in this embodiment of the present invention.

Optionally, in an embodiment, the network device sends the downlink control signaling. The downlink control signaling may include first signaling and/or second signaling, the first signaling instructs the terminal device to feed back the statistical channel parameter information, and the second signaling instructs the terminal device to feed back the instantaneous channel parameter information. Optionally, the first signaling may be one piece of signaling and instructs the terminal device to feed back the statistical channel dimensionality parameter and the statistical channel quantization parameter in the statistical channel parameter information. Alternatively, the first signaling may include first sub-signaling and second sub-signaling, the first sub-signaling instructs the terminal device to feed back the statistical channel dimensionality parameter in the statistical channel parameter information, and the second sub-signaling instructs the terminal device to feed back the statistical channel quantization parameter in the statistical channel parameter information. Similarly, the second signaling may be one piece of signaling and instructs the terminal device to feed back the instantaneous channel dimensionality parameter and the instantaneous channel quantization parameter in the instantaneous channel parameter information. Alternatively, the second signaling may include third sub-signaling and fourth sub-signaling, the third sub-signaling instructs the terminal device to feed back the instantaneous channel dimensionality parameter in the instantaneous channel parameter information, and the fourth sub-signaling instructs the terminal device to feed back the instantaneous channel quantization parameter in the instantaneous channel parameter information.

Optionally, in an embodiment, the network device may trigger, by adding the downlink control signaling to a control field, the terminal device to feed back the statistical channel parameter information and the instantaneous channel parameter information. Specifically, the downlink control signaling may be sent using a first control field and/or a second control field, where the first control field instructs the terminal device to feed back the statistical channel parameter information, and the second control field instructs the terminal device to feed back the instantaneous channel parameter information. Optionally, the first control field may occupy one bit or at least two bits, and instructs the terminal device to feed back the statistical channel dimensionality parameter and the statistical channel quantization parameter in the statistical channel parameter information. The first control field may include a first control sub-field and a second control sub-field, which respectively instruct the terminal device to feed back the parameters in the statistical channel parameter information. The first control sub-field instructs the terminal device to feed back the statistical channel dimensionality parameter in the statistical channel parameter information, and the second control sub-field instructs the terminal device to feed back the statistical channel quantization parameter in the statistical channel parameter information. The first control sub-field and the second control sub-field each may occupy one bit or at least two bits. This is not limited in this embodiment of the present invention. Similarly, the second control field may occupy one bit or at least two bits, and instructs the terminal device to feed back the instantaneous channel dimensionality parameter and the instantaneous channel quantization parameter in the instantaneous channel parameter information. The second control field may include a third control sub-field and a fourth control sub-field, which respectively instruct the terminal device to feed back the parameters in the instantaneous channel parameter information. The third control sub-field instructs the terminal device to feed back the instantaneous channel dimensionality parameter in the instantaneous channel parameter information, and the fourth control sub-field instructs the terminal device to feed back the instantaneous channel quantization parameter in the instantaneous channel parameter information. The third control sub-field and the fourth control sub-field each may occupy one bit or at least two bits. This is not limited in this embodiment of the present invention. For example, for the first control sub-field of the first control field, the first control sub-field may occupy one bit. That is, when "0" is displayed in the control field, it may indicate that the statistical channel dimensionality parameter, indicated by the first control sub-field, in the statistical channel parameter information is not fed back; when "1" is displayed in the control field, it may indicate that the statistical channel dimensionality parameter, indicated by the first control sub-field, in the statistical channel parameter information needs to be fed back by the terminal device.

Figure 2:
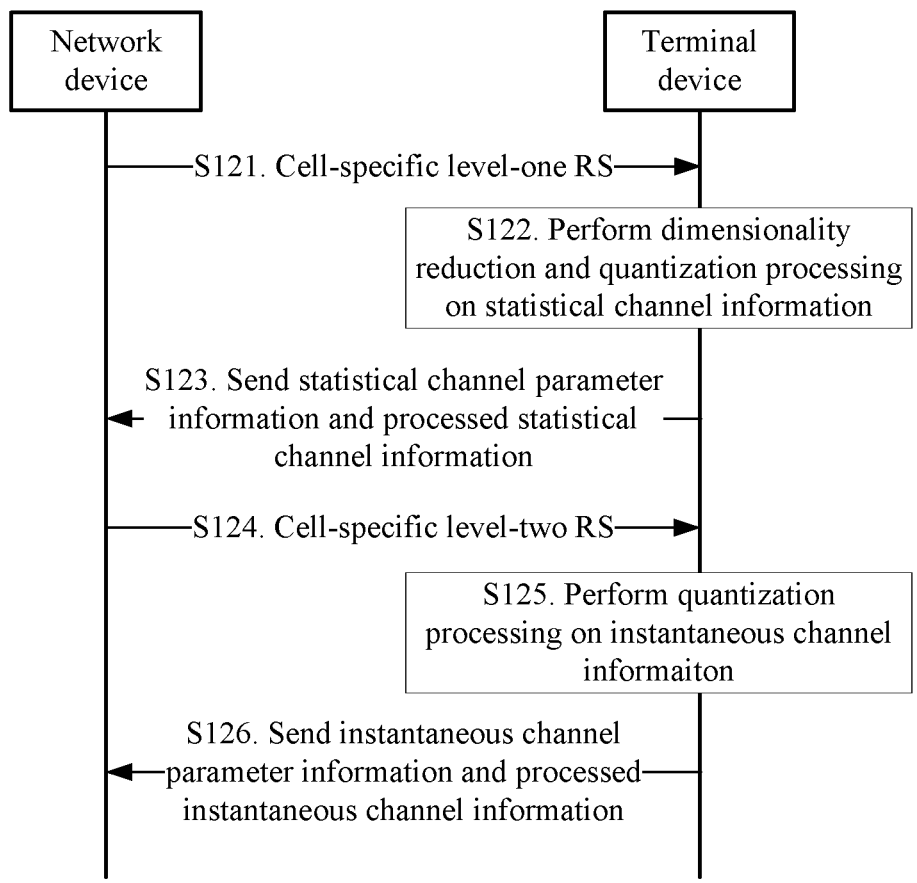
FIG. 2 is another schematic flowchart of a multi-antenna data transmission method according to an embodiment of the present invention.

In S120 and S130, the terminal device determines, according to the downlink control signaling sent by the network device, the statistical channel parameter information and/or the instantaneous channel parameter information that need/needs to be fed back, and feeds back the statistical channel parameter information and/or the instantaneous channel parameter information to the network device. Specifically, the terminal device may determine the statistical channel parameter information and the instantaneous channel parameter information using a method shown in FIG. 2. FIG. 2 is another schematic flowchart of a multi-antenna data transmission method 100 according to an embodiment of the present invention. As shown in FIGS. 2, S120 and S130 in the method 100 may specifically include the following steps.

S121. The network device sends a level-one RS to the terminal device, where the level-one RS may be a cell-specific level-one RS or a level-one RS corresponding to a UE group.

S122. The terminal device receives the level-one RS sent by the network device; obtains the corresponding statistical channel information by means of computation after measuring the instantaneous channels many times; performs dimensionality reduction and quantization on the statistical channel information to obtain processed statistical channel information; and determines the statistical channel parameter information used during processing, where the statistical channel parameter information may include a statistical channel dimensionality parameter and a statistical channel quantization parameter.

Specifically, the terminal device receiving the level-one RS may be a to-be-scheduled terminal device. The to-be-scheduled terminal device and the network device first reach an agreement, and the to-be-scheduled terminal device measures the cell-specific level-one RS after receiving the cell-specific level-one RS sent by the network device. Optionally, the terminal device may determine statistical channel information on a wideband or a sub-band. This is not limited in this embodiment of the present invention.

Specifically, in this embodiment of the present invention, it is assumed that there are M level-one RS antenna ports. The terminal device obtains the statistical channel information by measuring the instantaneous channels many times. The statistical channel information may be an autocorrelation matrix of the statistical channel, as shown in formula (1):

$$R_i = E(H^H H) = \alpha R_{i-1} H_i^H H_i \quad (1)$$

The autocorrelation matrix of the statistical channel may be obtained by means of filtering using α. That is, an autocorrelation matrix of an instantaneous channel is obtained by means of measurement on the instantaneous channel, iterative processing is performed according to formula (1), and the autocorrelation matrix $R_i$ of the statistical channel can be obtained at an $i^{th}$ time of measurement.

The terminal device performs eigenvalue decomposition (Eigenvalue Decomposition, EVD for short) or singular value decomposition (Singular Value Decomposition, SVD for short) on $R_i$ to obtain formula (2):

$$R_i = U\Lambda U^H = (u_1 u_2 \ldots u_M) \mathrm{diag}(\lambda_1 \lambda_2 \ldots \lambda_M)(u_1 u_2 \ldots u_M)^H \quad (2)$$

A relation $\lambda_1 \geq \lambda_2 \geq \ldots \lambda_S \gg \lambda_{S+1} \geq \ldots \geq \lambda_M$ holds true. S herein is the statistical channel dimensionality parameter in the statistical channel parameter information that needs to be fed back by the terminal device. The statistical channel dimensionality parameter S satisfies: S≤max(M, a quantity of receive antennas). In a case of massive MIMO, M satisfies: M>a quantity of receive antennas, and S satisfies: S≤M. When a value of S is less than M, it is equivalent to that a dimensionality is reduced. Specifically, this may be understood as follows: A channel matrix dimensionality is originally M, and when the value of S is less than M, it is equivalent to that the channel matrix dimensionality is reduced to S.

There may be a preset codebook first, and the codebook may be marked as C. The codebook may be selected from a plurality of codebooks. In terms of codebook design, a prior-art codebook may be used or a new codebook may be designed. For example, an element in the codebook C may be a quantized floating point matrix or vector. $\tilde{U} = [u_1 u_2 \ldots u_S]$ is a precoding matrix including the first S vectors in $U = [u_1 u_2 \ldots u_M]$, and an index corresponding to a precoding matrix most similar to $\tilde{U} = [u_1 u_2 \ldots u_S]$ is found in the codebook C using $\acute{U} = [u_1 u_2 \ldots u_S]$. This process may be understood as a quantization process of $\tilde{U} = [u_1 u_2 \ldots u_S]$. With reference to the foregoing example of the codebook, the quantization process of $\acute{U} = [u_1 u_2 \ldots u_S]$ may be understood as converting irregular floating point vectors or an irregular floating point matrix into regular floating point vectors or a regular floating point matrix, so that $\tilde{U} = [u_1 u_2 \ldots u_S]$ can be expressed by an index. Certainly, as can be understood by a person skilled in the art, there may be many other quantization manners. The index is marked as SI. Therefore, SI may be understood as an index obtained after $\tilde{U} = [u_1 u_2 \ldots u_S]$ is quantized.

S123. The terminal device measures the instantaneous channels many times to obtain the statistical channel information; performs dimensionality reduction and quantization processing on the statistical channel information to obtain the processed statistical channel information; and feeds back, to the network device, the processed statistical channel information and the statistical channel parameter information that is determined according to the processed statistical channel information, where the statistical channel parameter information may include the statistical channel dimensionality parameter S and/or the statistical channel quantization parameter SI.

Optionally, S124 is further included: The network device sends a level-two RS to the terminal device, where the level-two RS may be a UE-specific RS. Optionally, the network device may schedule a terminal device, determine a set of terminal devices participating in multiple-input multiple-output, and send the level-two RS to the terminal device in the set of terminal devices. Participation in multiple-input multiple-output may include participation in SU-MIMO or MU-MIMO.

Specifically, the network device sends the UE-specific level-two RS to the terminal device using the statistical channel information obtained after dimensionality reduction. In other words, the network device sends a precoded level-two RS to the terminal device. The prior art may be used to precode the level-two RS. Specifically, the network device may further determine a precoding matrix according to the statistical channel parameter information S and SI that are fed back by the terminal device, and multiply the precoding matrix by the level-two RS to obtain the precoded level-two RS. The statistical channel parameter information is determined by the terminal device by performing dimensionality reduction and quantization processing on the statistical channel information. Therefore, sending the level-two RS after precoding may be equivalent to sending the level-two RS by the network device using the statistical channel information obtained after dimensionality reduction. The network device may send the level-two RS to only the terminal device in the set of terminal devices, so that system overheads can be controlled.

It should be understood that the network device may precode the level-two RS according to statistical channel parameter information fed back by a single terminal device, and send precoded level-two RS to the terminal device. Alternatively, the network device may compute, in a statistical manner according to statistical channel parameter information fed back by a plurality of terminal devices, the statistical channel parameter information, precode the level-two RS according to a computation result, and send precoded level-two RS to some of the terminal devices.

Optionally, S125 is further included: After receiving, using the statistical channel information obtained after dimensionality reduction, the UE-specific precoded level-two RS sent by the network device, the terminal device measures an instantaneous channel to obtain instantaneous channel information, and quantizes the instantaneous channel information to obtain processed instantaneous channel information. The UE measures the instantaneous channel to obtain the instantaneous channel information. An effective dimensionality value of the instantaneous channel information is an instantaneous channel dimensionality parameter in the instantaneous channel parameter, and is corresponding to a rank value RI (Rank Indication) of an antenna matrix in a MIMO solution. An instantaneous channel quantization parameter in the instantaneous channel parameter information is corresponding to a precoding matrix indication (PMI). That is, the precoded instantaneous channel information is quantized to obtain $H\tilde{U}$, where a quantized precoding index corresponding to eigenvector space corresponding to RI maximum eigenvalues of $H\tilde{U}$ is a PMI.

Optionally, S126 is further included: The terminal device feeds back the instantaneous channel parameter information and the processed instantaneous channel information to the network device, where the processed instantaneous channel information is the instantaneous channel information obtained after quantization processing.

As shown in FIG. 1, after the terminal device determines the statistical channel parameter information and the instantaneous channel parameter information in S120, the terminal device sends the statistical channel parameter information and the instantaneous channel parameter information to the network device in S130. Similarly, the terminal device feeds back, to the network device, the processed statistical channel information that is obtained after processing is performed according to the statistical channel parameter information and the processed instantaneous channel information that is obtained after processing is performed according to the instantaneous channel parameter information.

Optionally, in S140, the network device processes downlink data and/or a UE-specific demodulation reference signal by means of two-level precoding. Specifically, the two-level precoding includes level-one precoding corresponding to the processed statistical channel information received by the network device and level-two precoding corresponding to the processed instantaneous channel information received by the network device. Specifically, in the level-one precoding, the network device determines a level-one precoding matrix according to the statistical channel parameter information, and in the level-two precoding, the network device determines a level-two precoding matrix according to the instantaneous channel parameter information. The network device multiplies the data or the UE-specific reference signal by the level-one precoding matrix and the level-two precoding matrix, that is, performs the two-level precoding on the data.

Optionally, in S150, the network device sends, to the terminal device, the downlink data and/or the UE-specific demodulation reference signal that are/is obtained by means of the two-level precoding processing.

Optionally, in S160, after receiving the downlink data and the UE-specific demodulation reference signal that are sent by the network device, the terminal device demodulates the UE-specific demodulation reference signal, estimates a data channel, and demodulates the downlink data.

Therefore, according to the multi-antenna data transmission method in this embodiment of the present invention, the network device sends the downlink control signaling to the terminal device, to instruct the terminal device to feed back the statistical channel parameter information and the instantaneous channel parameter information; and performs the two-level precoding on the downlink data according to the parameter information fed back by the terminal device, so that the parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

The foregoing details the multi-antenna data transmission methods according to the embodiments of the present invention with reference to FIG. 1 and FIG. 2. The descriptions of the method embodiments may be applied to apparatus embodiments, and details are not described again. The following describes multi-antenna data transmission apparatuses according to embodiments of the present invention with reference to FIG. 3 to FIG. 7.

Figure 3:
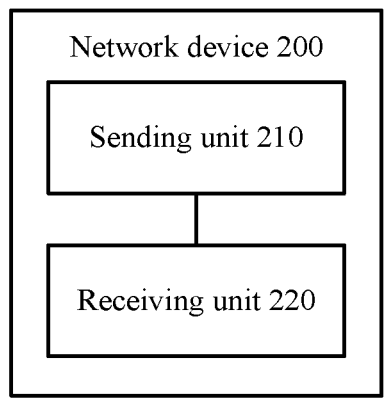
FIG. 3 is a schematic block diagram of a multi-antenna data transmission network device according to an embodiment of the present invention.

As shown in FIG. 3, a multi-antenna data transmission network device 200 according to an embodiment of the present invention includes:

a sending unit 210, configured to send downlink control signaling to a terminal device, where the downlink control signaling instructs the terminal device to feed back statistical channel parameter information, the statistical channel parameter information is determined by the terminal device according to statistical channel information, and the statistical channel information is obtained by means of computation after the terminal device measures instantaneous channels many times; and a receiving unit 220, configured to receive the statistical channel parameter information that is determined according to the downlink control signaling and that is sent by the terminal device.

Therefore, the multi-antenna data transmission network device in this embodiment of the present invention sends the downlink control signaling to the terminal device, to instruct the terminal device to feed back the statistical channel parameter information, where the statistical channel parameter information may be obtained by the terminal device by processing the statistical channel information. According to this method, the network device can obtain the statistical channel information or information related to the statistical channel information (for example, the statistical channel parameter information), so that the network device processes downlink data according to the parameter information fed back by the terminal device.

Optionally, the network device 200 further includes: a processing unit 230, configured to process downlink data according to the statistical channel parameter information, and send processed downlink data to the terminal device using the sending unit 210.

Optionally, the statistical channel parameter information is determined by the terminal device by performing dimensionality reduction and quantization processing on the statistical channel information, and the statistical channel information is obtained by means of computation after the terminal device measures the instantaneous channels many times according to a level-one reference signal RS sent by the network device.

Optionally, the statistical channel parameter information includes a statistical channel dimensionality parameter and a statistical channel quantization parameter, where the statistical channel dimensionality parameter indicates an effective dimensionality value of statistical channel information obtained after dimensionality reduction; and the statistical channel quantization parameter indicates a quantization index parameter that is required when the terminal device performs quantization processing on the statistical channel information obtained after dimensionality reduction.

Optionally, the downlink control signaling is further used to instruct the terminal device to feed back instantaneous channel parameter information, the instantaneous channel parameter information is determined by the terminal device according to instantaneous channel information, and the instantaneous channel information is obtained by the terminal device by measuring an instantaneous channel; and the receiving unit 220 is further configured to receive the instantaneous channel parameter information that is determined according to the downlink control signaling and that is sent by the terminal device.

Optionally, the processing unit 230 is further configured to process the downlink data according to the statistical channel parameter information and the instantaneous channel parameter information, and send processed downlink data to the terminal device using the sending unit 210.

Optionally, the instantaneous channel parameter information is determined by the terminal device by performing quantization processing on the instantaneous channel information, the instantaneous channel information is obtained by the terminal device by measuring the instantaneous channel according to a precoded level-two RS sent by the network device, and the precoded level-two RS is determined by the network device by precoding the level-two RS according to the statistical channel parameter information.

Optionally, the instantaneous channel parameter information includes an instantaneous channel dimensionality parameter and an instantaneous channel quantization parameter, where the instantaneous channel dimensionality parameter indicates an effective dimensionality value of the instantaneous channel information; and the instantaneous channel quantization parameter indicates a quantization index parameter that is required when the terminal device quantizes the instantaneous channel information.

Optionally, the downlink control signaling includes first signaling and second signaling, the first signaling instructs the terminal device to feed back the statistical channel parameter information, and the second signaling instructs the terminal device to feed back the instantaneous channel parameter information.

Optionally, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

Optionally, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

Optionally, the downlink control signaling instructs the terminal device to periodically feed back the statistical channel parameter information and the instantaneous channel parameter information.

Optionally, the downlink control signaling occupies a first control field and a second control field, the first control field is used to instruct the terminal device to feed back the statistical channel parameter information, and the second control field is used to instruct the terminal device to feed back the instantaneous channel parameter information.

Optionally, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

Optionally, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

Optionally, the receiving unit 220 is specifically configured to receive the statistical channel parameter information, the processed statistical channel information, the instantaneous channel parameter information, and the processed instantaneous channel information that are determined according to the downlink control signaling and that are sent by the terminal device. The sending unit 210 is specifically configured to send, to the terminal device, downlink data obtained after two-level precoding processing is performed, where the two-level precoding includes level-one precoding performed according to the statistical channel parameter information and the processed statistical channel information, and level-two precoding performed according to the instantaneous channel parameter information and the processed instantaneous channel information.

It should be understood that the multi-antenna data transmission network device 200 according to this embodiment of the present invention may be corresponding to the network device that performs the method 100 in the embodiments of the present invention. In addition, both the foregoing and other operations and/or functions of the units in the network device 200 are to implement corresponding procedures of the network device in the methods in FIG. 1 and FIG. 2. For brevity, details are not repeated herein again.

Therefore, the multi-antenna data transmission network device in this embodiment of the present invention sends the downlink control signaling to the terminal device, to instruct the terminal device to feed back the statistical channel parameter information and the instantaneous channel parameter information; and performs the two-level precoding on the downlink data according to the parameter information fed back by the terminal device, so that the parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

Figure 4:
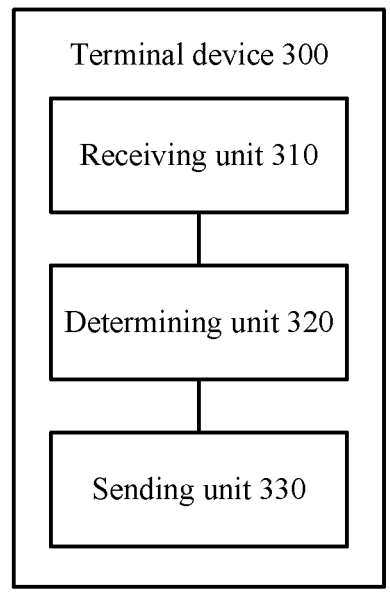
FIG. 4 is a schematic block diagram of a multi-antenna data transmission terminal device according to an embodiment of the present invention.

As shown in FIG. 4, a multi-antenna data transmission terminal device 300 according to an embodiment of the present invention includes:

a receiving unit 310, configured to receive downlink control signaling sent by a network device, where the downlink control signaling instructs the terminal device to feed back statistical channel parameter information to the network device;

a determining unit 320, configured to determine the statistical channel parameter information according to statistical channel information that is obtained by means of computation after the determining unit 320 measures a plurality of instantaneous channels; and a sending unit 330, configured to feed back the statistical channel parameter information to the network device according to the downlink control signaling.

Therefore, the multi-antenna data transmission terminal device in this embodiment of the present invention receives the downlink control signaling sent by the network device, and feeds back the statistical channel parameter information to the network device according to the downlink control signaling. The terminal device processes the statistical channel information that is obtained by means of measurement performed by the terminal device on the instantaneous channels many times, to determine the statistical channel parameter information, and feeds back the statistical channel parameter information to the network device. This resolves a prior-art problem that the statistical channel information or information related to the statistical channel information (for example, the statistical channel parameter information) cannot be fed back to the network device, so that the network device processes downlink data according to the parameter information fed back by the terminal device.

Optionally, the receiving unit 310 is further configured to receive downlink data sent by the network device, where the downlink data is data obtained by the network device by performing processing according to the statistical channel parameter information.

Optionally, the determining unit 320 is specifically configured to: measure the plurality of instantaneous channels according to a level-one reference signal RS sent by the network device, to obtain the statistical channel information by means of computation; and perform dimensionality reduction and quantization processing on the statistical channel information to determine the statistical channel parameter information.

Optionally, the statistical channel parameter information includes a statistical channel dimensionality parameter and a statistical channel quantization parameter, and the determining unit 320 is specifically configured to: perform dimensionality reduction processing on the statistical channel information, and determine, as the statistical channel dimensionality parameter, an effective dimensionality value of statistical channel information obtained after dimensionality reduction; and perform quantization processing on the statistical channel information obtained after dimensionality reduction, and determine, as the statistical channel quantization parameter, a quantization index parameter that is required when quantization processing is performed.

Optionally, the downlink control signaling is further used to instruct the terminal device to feed back instantaneous channel parameter information to the network device, and the determining unit 320 is further configured to determine the instantaneous channel parameter information according to instantaneous channel information that is obtained by means of measurement performed by the determining unit 320 on an instantaneous channel; and the sending unit 330 is further configured to feed back the instantaneous channel parameter information to the network device according to the downlink control signaling.

Optionally, the receiving unit 310 is further configured to receive downlink data sent by the network device, where the downlink data is data obtained by the network device by performing processing according to the statistical channel parameter information and the instantaneous channel parameter information.

Optionally, the determining unit 320 is specifically configured to: measure the instantaneous channel according to a precoded level-two RS sent by the network device, to obtain the instantaneous channel information, where the precoded level-two RS is determined by the network device by precoding the level-two RS according to the statistical channel parameter information; and perform quantization processing on the instantaneous channel information to determine the instantaneous channel parameter information.

Optionally, the instantaneous channel parameter information includes an instantaneous channel dimensionality parameter and an instantaneous channel quantization parameter, and the determining unit 320 is specifically configured to: determine an effective dimensionality value of the instantaneous channel information as the instantaneous channel dimensionality parameter; and perform quantization processing on the instantaneous channel information, and determine, as the instantaneous channel quantization parameter, a quantization index parameter that is required when quantization processing is performed.

Optionally, the downlink control signaling includes first signaling and second signaling, the first signaling instructs the terminal device to feed back the statistical channel parameter information, and the second signaling instructs the terminal device to feed back the instantaneous channel parameter information.

Optionally, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

Optionally, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

Optionally, the downlink control signaling instructs the terminal device to periodically feed back the statistical channel parameter information and the instantaneous channel parameter information.

Optionally, the downlink control signaling occupies a first control field and a second control field, the first control field is used to instruct the terminal device to feed back the statistical channel parameter information, and the second control field is used to instruct the terminal device to feed back the instantaneous channel parameter information.

Optionally, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

Optionally, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

It should be understood that the multi-antenna data transmission terminal device 300 according to this embodiment of the present invention may be corresponding to the terminal device that performs the method 100 in the embodiments of the present invention. In addition, both the foregoing and other operations and/or functions of the units in the terminal device 300 are to implement corresponding procedures of the terminal device in the methods in FIG. 1 and FIG. 2. For brevity, details are not repeated herein again.

Therefore, the multi-antenna data transmission terminal device in this embodiment of the present invention receives the downlink control signaling sent by the network device, and feeds back the statistical channel parameter information and the instantaneous channel parameter information to the network device; and the network device performs two-level precoding on the downlink data according to the parameter information fed back by the terminal device, so that parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

Figure 5:
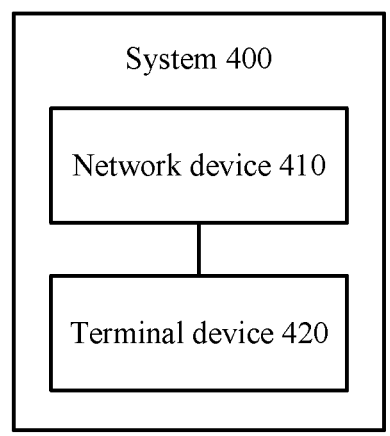
FIG. 5 is a schematic block diagram of a multi-antenna data transmission system according to an embodiment of the present invention.

FIG. 5 is a schematic block diagram of a multi-antenna data transmission system 400 according to an embodiment of the present invention. As shown in FIG. 5, the system 400 includes a network device 410 and a terminal device 420. The network device 410 may be the network device 200 shown in FIG. 3, and the terminal device may be the terminal device 300 shown in FIG. 4. Details are not repeated herein again.

To better implement the foregoing solutions in the embodiments of the present invention, the present invention further provides related devices to cooperate in implementing the foregoing solutions.

Figure 6:
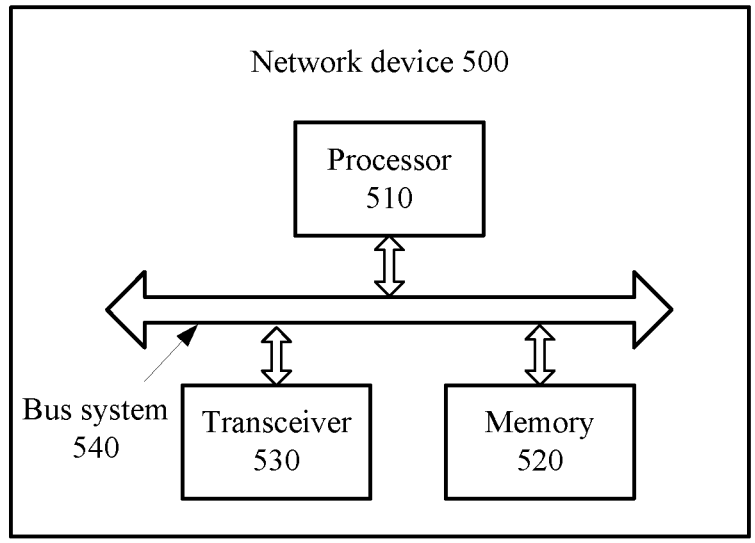
FIG. 6 is a schematic block diagram of a multi-antenna data transmission network device according to another embodiment of the present invention.

As shown in FIG. 6, an embodiment of the present invention further provides a multi-antenna data transmission network device 500. The network device 500 includes a processor 510 and a transceiver 530. Optionally, the network device 500 includes a memory 520. Optionally, the network device 500 further includes a bus system 540. The processor 510, the memory 520, and the transceiver 530 are connected using the bus system 540, the memory 520 is configured to store an instruction, and the processor 510 is configured to execute the instruction stored in the memory 520, so as to control the transceiver 530 to receive and send signals. The transceiver 530 is configured to send downlink control signaling to a terminal device, where the downlink control signaling instructs the terminal device to feed back statistical channel parameter information, the statistical channel parameter information is determined by the terminal device according to statistical channel information, and the statistical channel information is obtained by means of computation after the terminal device measures instantaneous channels many times. The transceiver 530 is configured to receive the statistical channel parameter information that is determined according to the downlink control signaling and that is sent by the terminal device. The processor 510 is configured to: process downlink data according to the statistical channel parameter information, and send processed downlink data to the terminal device using the transceiver 530.

Therefore, the multi-antenna data transmission network device in this embodiment of the present invention sends the downlink control signaling to the terminal device, where the downlink control signaling may be used to instruct the terminal device to feed back the statistical channel parameter information, and the statistical channel parameter information may be obtained by the terminal device by processing the statistical channel information, so that the downlink data is processed according to the parameter information fed back by the terminal device.

It should be understood that in this embodiment of the present invention, the processor 510 may be a central processing unit (CPU), and the processor 510 may alternatively be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 520 may include a read-only memory and a random access memory, and provide the instruction and data for the processor 510. A part of the memory 520 may further include a non-volatile random access memory. For example, the memory 520 may further store device type information.

The bus system 540 may include not only a data bus but also a power bus, a control bus, a status signal bus, and the like. However, for clear description, various buses are denoted by the bus system 540 in the figure.

During implementation, the steps of the methods may be implemented by an integrated logic circuit of hardware in the processor 510 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art. The storage medium is located in the memory 520, and the processor 510 reads the information from the memory 520 and implements, in combination with hardware of the processor 510, the steps of the methods. To avoid repetition, details are not repeated herein again.

Optionally, the statistical channel parameter information is determined by the terminal device by performing dimensionality reduction and quantization processing on the statistical channel information, and the statistical channel information is obtained by means of computation after the terminal device measures the instantaneous channels many times according to a level-one reference signal RS sent by the network device.

Optionally, the statistical channel parameter information includes a statistical channel dimensionality parameter and a statistical channel quantization parameter, where the statistical channel dimensionality parameter indicates an effective dimensionality value of statistical channel information obtained after dimensionality reduction; and the statistical channel quantization parameter indicates a quantization index parameter that is required when the terminal device performs quantization processing on the statistical channel information obtained after dimensionality reduction.

Optionally, the downlink control signaling is further used to instruct the terminal device to feed back instantaneous channel parameter information, the instantaneous channel parameter information is determined by the terminal device according to instantaneous channel information, and the instantaneous channel information is obtained by the terminal device by measuring an instantaneous channel; and the transceiver 530 is further configured to receive the instantaneous channel parameter information that is determined according to the downlink control signaling and that is sent by the terminal device.

Optionally, the processor 510 is further configured to process the downlink data according to the statistical channel parameter information and the instantaneous channel parameter information, and send the processed downlink data to the terminal device using the transceiver 530.

Optionally, the instantaneous channel parameter information is determined by the terminal device by performing quantization processing on the instantaneous channel information, the instantaneous channel information is obtained by the terminal device by measuring the instantaneous channel according to a precoded level-two RS sent by the network device, and the precoded level-two RS is determined by the network device by precoding the level-two RS according to the statistical channel parameter information.

Optionally, the instantaneous channel parameter information includes an instantaneous channel dimensionality parameter and an instantaneous channel quantization parameter, where the instantaneous channel dimensionality parameter indicates an effective dimensionality value of the instantaneous channel information; and the instantaneous channel quantization parameter indicates a quantization index parameter that is required when the terminal device quantizes the instantaneous channel information.

Optionally, the downlink control signaling includes first signaling and second signaling, the first signaling instructs the terminal device to feed back the statistical channel parameter information, and the second signaling instructs the terminal device to feed back the instantaneous channel parameter information.

Optionally, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

Optionally, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

Optionally, the downlink control signaling instructs the terminal device to periodically feed back the statistical channel parameter information and the instantaneous channel parameter information.

Optionally, the downlink control signaling occupies a first control field and a second control field, the first control field is used to instruct the terminal device to feed back the statistical channel parameter information, and the second control field is used to instruct the terminal device to feed back the instantaneous channel parameter information.

Optionally, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

Optionally, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

Optionally, the transceiver 530 is specifically configured to: receive the statistical channel parameter information, the processed statistical channel information, the instantaneous channel parameter information, and the processed instantaneous channel information that are determined according to the downlink control signaling and that are sent by the terminal device; and send, to the terminal device, downlink data obtained after two-level precoding processing is performed, where the two-level precoding includes level-one precoding performed by the processor 510 according to the statistical channel parameter information and the processed statistical channel information, and level-two precoding performed by the processor 510 according to the instantaneous channel parameter information and the processed instantaneous channel information.

It should be understood that the multi-antenna data transmission network device 500 according to this embodiment of the present invention may be corresponding to the network device 200 in the embodiments of the present invention and may be corresponding to the network device that performs the method 100 in the embodiments of the present invention. In addition, both the foregoing and other operations and/or functions of the modules in the network device 500 are to implement corresponding procedures of the network device in the methods in FIG. 1 and FIG. 2. For brevity, details are not repeated herein again.

Therefore, the multi-antenna data transmission network device in this embodiment of the present invention sends the downlink control signaling to the terminal device, to instruct the terminal device to feed back the statistical channel parameter information and the instantaneous channel parameter information; and performs the two-level precoding on the downlink data according to the parameter information fed back by the terminal device, so that the parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

Figure 7:
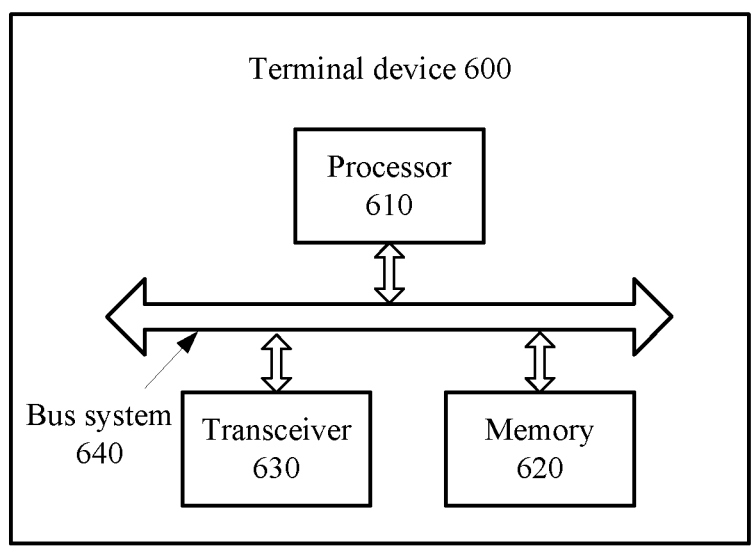
FIG. 7 is a schematic block diagram of a multi-antenna data transmission terminal device according to another embodiment of the present invention.

As shown in FIG. 7, an embodiment of the present invention further provides a multi-antenna data transmission terminal device 600. The terminal device 600 includes a processor 610 and a transceiver 630. Optionally, the terminal device 600 may further include a memory 620. Optionally, the terminal device 600 may further include a bus system 640. The processor 610, the memory 620, and the transceiver 630 are connected using the bus system 640, the memory 620 is configured to store an instruction, and the processor 610 is configured to execute the instruction stored in the memory 620, so as to control the transceiver 630 to receive a signal. The transceiver 630 is configured to receive downlink control signaling sent by a network device, where the downlink control signaling instructs the terminal device to feed back statistical channel parameter information to the network device. The processor 610 is configured to determine the statistical channel parameter information according to statistical channel information obtained by means of computation after the processor 610 measures a plurality of instantaneous channels.

Therefore, the multi-antenna data transmission terminal device in this embodiment of the present invention receives the downlink control signaling sent by the network device, and feeds back the statistical channel parameter information to the network device according to the downlink control signaling. The terminal device processes the statistical channel information that is obtained by means of measurement performed by the terminal device on the instantaneous channels many times, to determine the statistical channel parameter information, and feeds back the statistical channel parameter information to the network device. This resolves a prior-art problem that the statistical channel information or information related to the statistical channel information (for example, the statistical channel parameter information) cannot be fed back to the network device, so that the network device processes downlink data according to the parameter information fed back by the terminal device.

It should be understood that in this embodiment of the present invention, the processor 610 may be a CPU, or the processor 610 may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

The memory 620 may include a read-only memory and a random access memory, and provide the instruction and data for the processor 610. A part of the memory 620 may further include a non-volatile random access memory. For example, the memory 620 may further store device type information.

The bus system 640 may include not only a data bus but also a power bus, a control bus, a status signal bus, and the like. However, for clear description, various buses are denoted by the bus system 640 in the figure.

During implementation, the steps of the methods may be implemented by an integrated logic circuit of hardware in the processor 610 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art. The storage medium is located in the memory 620, and the processor 610 reads the information from the memory 620 and implements, in combination with hardware of the processor 610, the steps of the methods. To avoid repetition, details are not repeated herein again.

Optionally, the processor 610 is specifically configured to: measure the plurality of instantaneous channels according to a level-one reference signal RS sent by the network device, to obtain the statistical channel information by means of computation; and perform dimensionality reduction and quantization processing on the statistical channel information to determine the statistical channel parameter information.

Optionally, the statistical channel parameter information includes a statistical channel dimensionality parameter and a statistical channel quantization parameter, and the processor 610 is specifically configured to: perform dimensionality reduction processing on the statistical channel information, and determine, as the statistical channel dimensionality parameter, an effective dimensionality value of statistical channel information obtained after dimensionality reduction; and perform quantization processing on the statistical channel information obtained after dimensionality reduction, and determine, as the statistical channel quantization parameter, a quantization index parameter that is required when quantization processing is performed.

Optionally, the downlink control signaling is further used to instruct the terminal device to feed back instantaneous channel parameter information to the network device, and the processor 610 is further configured to determine the instantaneous channel parameter information according to instantaneous channel information that is obtained by means of measurement performed by the processor 610 on an instantaneous channel; and the transceiver 630 is further configured to feed back the instantaneous channel parameter information to the network device according to the downlink control signaling.

Optionally, the processor 610 is specifically configured to: measure the instantaneous channel according to a precoded level-two RS sent by the network device, to obtain the instantaneous channel information, where the precoded level-two RS is determined by the network device by precoding the level-two RS according to the statistical channel parameter information; and perform quantization processing on the instantaneous channel information to determine the instantaneous channel parameter information.

Optionally, the instantaneous channel parameter information includes an instantaneous channel dimensionality parameter and an instantaneous channel quantization parameter, and the processor 610 is specifically configured to: determine an effective dimensionality value of the instantaneous channel information as the instantaneous channel dimensionality parameter; and perform quantization processing on the instantaneous channel information, and determine, as the instantaneous channel quantization parameter, a quantization index parameter that is required when quantization processing is performed.

Optionally, the downlink control signaling includes first signaling and second signaling, the first signaling instructs the terminal device to feed back the statistical channel parameter information, and the second signaling instructs the terminal device to feed back the instantaneous channel parameter information.

Optionally, the first signaling includes first sub-signaling and second sub-signaling, the first sub-signaling instructs the terminal device to feed back the statistical channel dimensionality parameter, and the second sub-signaling instructs the terminal device to feed back the statistical channel quantization parameter.

Optionally, the second signaling includes third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

Optionally, the downlink control signaling instructs the terminal device to periodically feed back the statistical channel parameter information and the instantaneous channel parameter information.

Optionally, the downlink control signaling occupies a first control field and a second control field, the first control field is used to instruct the terminal device to feed back the statistical channel parameter information, and the second control field is used to instruct the terminal device to feed back the instantaneous channel parameter information.

Optionally, the first control field includes a first control sub-field and a second control sub-field, the first control sub-field is used to instruct the terminal device to feed back the statistical channel dimensionality parameter, and the second control sub-field is used to instruct the terminal device to feed back the statistical channel quantization parameter.

Optionally, the second control field includes a third control sub-field and a fourth control sub-field, the third control sub-field is used to instruct the terminal device to feed back the instantaneous channel dimensionality parameter, and the fourth control sub-field is used to instruct the terminal device to feed back the instantaneous channel quantization parameter.

It should be understood that the multi-antenna data transmission terminal device 600 according to this embodiment of the present invention may be corresponding to the terminal device 300 in the embodiments of the present invention and may be corresponding to the terminal device that performs the method 100 in the embodiments of the present invention. In addition, both the foregoing and other operations and/or functions of the modules in the terminal device 600 are to implement corresponding procedures of the terminal device in the methods in FIG. 1 and FIG. 2. For brevity, details are not repeated herein again.

Therefore, the multi-antenna data transmission terminal device in this embodiment of the present invention receives the downlink control signaling sent by the network device, and feeds back the statistical channel parameter information and the instantaneous channel parameter information to the network device; and the network device performs two-level precoding on the downlink data according to the parameter information fed back by the terminal device, so that parameter information on which the two-level precoding is performed can be effectively obtained, and two-level CSI measurement can be successfully performed. This resolves prior-art technical problems of high uplink and downlink pilot overheads and a large quantity of uplink CSI feedbacks when there are a relatively large quantity of antennas at a data transmit end or a relatively large quantity of to-be-served UEs. In this way, more time-frequency resources can be used for data transmission in a system, and a system throughput is effectively increased.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or at least two units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM,), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multi-antenna data transmission method for performing two-level channel state information (CSI) measurement, the method comprising:

receiving, by a terminal device, downlink control signaling sent by a network device, wherein the downlink control signaling instructs the terminal device to feed back statistical channel parameter information to the network device;

determining, by the terminal device, the statistical channel parameter information according to statistical channel information that is obtained after the terminal device measures a plurality of instantaneous channels based on a level-one reference signal sent by the network device; and feeding back, by the terminal device, the statistical channel parameter information to the network device according to the downlink control signaling determining, by the terminal device, the instantaneous channel parameter information according to instantaneous channel information from one or more measurements performed by the terminal device on an instantaneous channel, the determining the instantaneous channel parameter information comprising:

measuring, by the terminal device, the instantaneous channel according to a precoded level-two reference signal (RS) sent by the network device, to obtain the instantaneous channel information, wherein the precoded level-two RS is determined by the network device by precoding the level-two RS according to the statistical channel parameter information; and performing, by the terminal device, quantization processing on the instantaneous channel information to determine the instantaneous channel parameter information; and feeding back, by the terminal device, the instantaneous channel parameter information to the network device according to the downlink control signaling.

2. The method according to claim 1 wherein the determining, by the terminal device, the statistical channel parameter information according to statistical channel information that is obtained after the terminal device measures a plurality of instantaneous channels comprises:

measuring, by the terminal device, the plurality of instantaneous channels according to a level-one reference signal (RS) sent by the network device, to obtain the statistical channel information; and performing, by the terminal device, dimensionality reduction and quantization processing on the statistical channel information to determine the statistical channel parameter information.

3. The method according to claim 2, wherein the statistical channel parameter information comprises a statistical channel dimensionality parameter and a statistical channel quantization parameter; and the performing, by the terminal device, dimensionality reduction and quantization processing on the statistical channel information to determine the statistical channel parameter information comprises:

performing, by the terminal device, dimensionality reduction processing on the statistical channel information, and determining, as the statistical channel dimensionality parameter, an effective dimensionality value of statistical channel information obtained after dimensionality reduction; and performing, by the terminal device, quantization processing on the statistical channel information obtained after dimensionality reduction, and determining, as the statistical channel quantization parameter, a quantization index parameter that is required when quantization processing is performed.

4. The method according to claim 1, wherein the instantaneous channel parameter information comprises an instantaneous channel dimensionality parameter and an instantaneous channel quantization parameter; and the performing, by the terminal device, quantization processing on the instantaneous channel information to determine the instantaneous channel parameter information comprises:

determining, by the terminal device, an effective dimensionality value of the instantaneous channel information as the instantaneous channel dimensionality parameter; and performing, by the terminal device, quantization processing on the instantaneous channel information, and determining, as the instantaneous channel quantization parameter, a quantization index parameter that is required when quantization processing is performed.

5. The method according to claim 4, wherein the downlink control signaling comprises first signaling and second signaling, the first signaling instructs the terminal device to feed back the statistical channel parameter information, and the second signaling instructs the terminal device to feed back the instantaneous channel parameter information.

6. The method according to claim 5, wherein the first signaling comprises first sub-signaling and second sub-signaling, the first sub-signaling instructs the terminal device to feed back the statistical channel dimensionality parameter, and the second sub-signaling instructs the terminal device to feed back the statistical channel quantization parameter.

7. The method according to claim 5, wherein the second signaling comprises third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

8. The method according to claim 4, wherein the downlink control signaling instructs the terminal device to periodically feed back the statistical channel parameter information and the instantaneous channel parameter information.

9. A multi-antenna data transmission terminal device, comprising:

a nontransitory memory comprising instructions; and
a processor coupled to the memory, wherein the instructions cause the processor to:

receive downlink control signaling sent by a network device, wherein the downlink control signaling instructs the terminal device to feed back statistical channel parameter information to the network device;

determine the statistical channel parameter information according to statistical channel information that is obtained after measuring a plurality of instantaneous channels; and feed back the statistical channel parameter information to the network device according to the downlink control signaling determine the instantaneous channel parameter information according to instantaneous channel information that is obtained by one or more measurements performed by the processor on an instantaneous channel comprising:

measure the instantaneous channel according to a precoded level-two RS sent by the network device, to obtain the instantaneous channel information, wherein the precoded level-two RS is determined by the network device by precoding the level-two RS according to the statistical channel parameter information; and perform quantization processing on the instantaneous channel information to determine the instantaneous channel parameter information; and feed back the instantaneous channel parameter information to the network device according to the downlink control signaling.

10. The terminal device according to claim 9, wherein the processor is configured to:

measure the plurality of instantaneous channels according to a level-one reference signal (RS) sent by the network device, to obtain the statistical channel information; and perform dimensionality reduction and quantization processing on the statistical channel information to determine the statistical channel parameter information.

11. The terminal device according to claim 10, wherein the statistical channel parameter information comprises a statistical channel dimensionality parameter and a statistical channel quantization parameter; and the processor is configured to:

perform dimensionality reduction processing on the statistical channel information, and determine, as the statistical channel dimensionality parameter, an effective dimensionality value of statistical channel information obtained after dimensionality reduction; and perform quantization processing on the statistical channel information obtained after dimensionality reduction, and determine, as the statistical channel quantization parameter, a quantization index parameter that is required when quantization processing is performed.

12. The terminal device according to claim 9, wherein the instantaneous channel parameter information comprises an instantaneous channel dimensionality parameter and an instantaneous channel quantization parameter; and the processor is configured to:

determine an effective dimensionality value of the instantaneous channel information as the instantaneous channel dimensionality parameter; and perform quantization processing on the instantaneous channel information, and determine, as the instantaneous channel quantization parameter, a quantization index parameter that is required when quantization processing is performed.

13. The terminal device according to claim 12, wherein the downlink control signaling comprises first signaling and second signaling, the first signaling instructs the terminal device to feed back the statistical channel parameter information, and the second signaling instructs the terminal device to feed back the instantaneous channel parameter information.

14. The terminal device according to claim 13, wherein the first signaling comprises first sub-signaling and second sub-signaling, the first sub-signaling instructs the terminal device to feed back the statistical channel dimensionality parameter, and the second sub-signaling instructs the terminal device to feed back the statistical channel quantization parameter.

15. The terminal device according to claim 14, wherein the second signaling comprises third sub-signaling and fourth sub-signaling, the third sub-signaling instructs the terminal device to feed back the instantaneous channel dimensionality parameter, and the fourth sub-signaling instructs the terminal device to feed back the instantaneous channel quantization parameter.

16. The terminal device according to claim 12, wherein the downlink control signaling instructs the terminal device to periodically feed back the statistical channel parameter information and the instantaneous channel parameter information.

* * * * *